No. 624,326. Patented May 2, 1899.
F. J. HAGEN.
CIGAR BRANDING MACHINE.
(Application filed Apr. 27, 1898.)
(No Model.) 2 Sheets—Sheet 1.
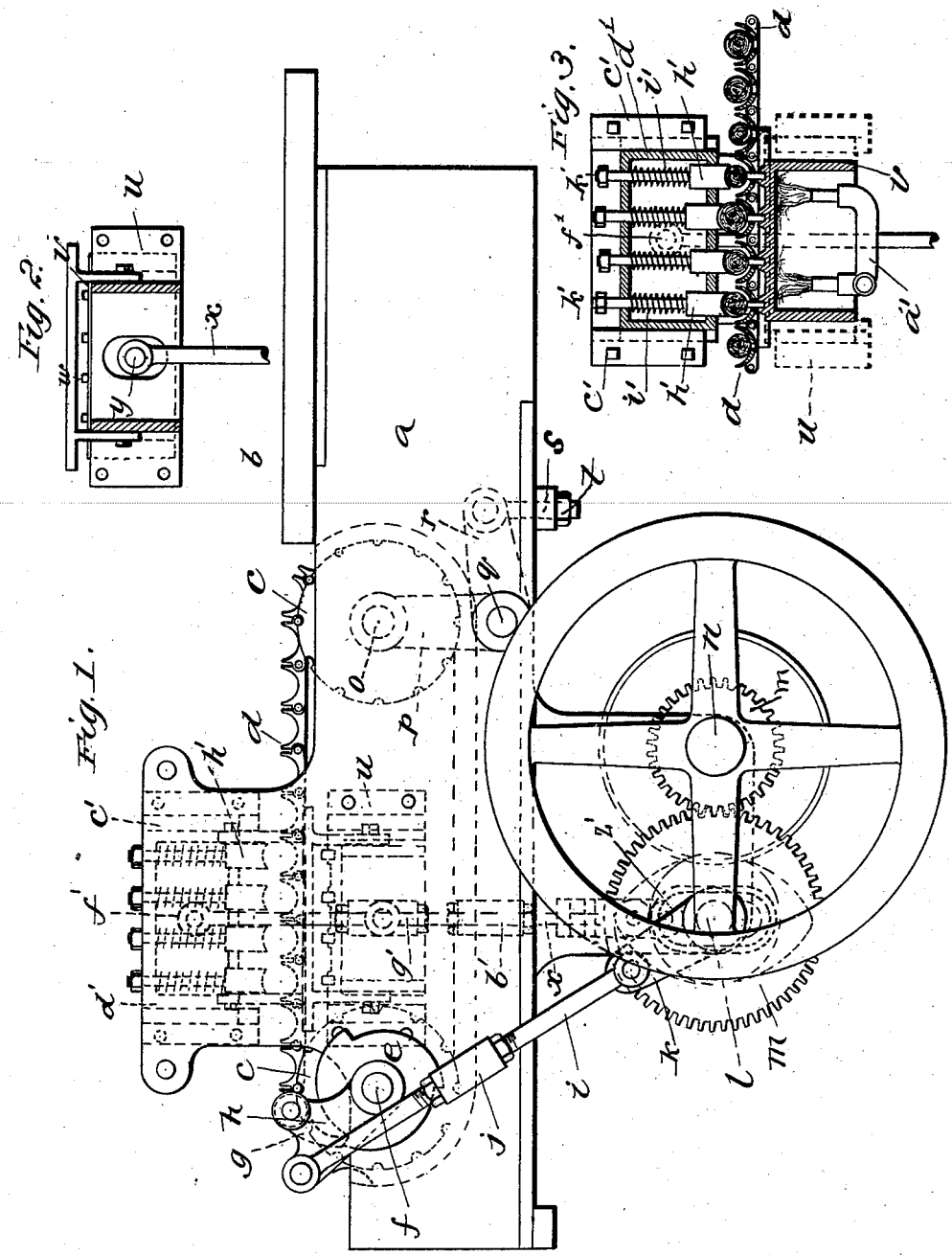
Witnesses
G. M. Lamasure
G. H. Walmsley
Inventor
Ferdinand J. Hagen
By David Davis
Attorneys

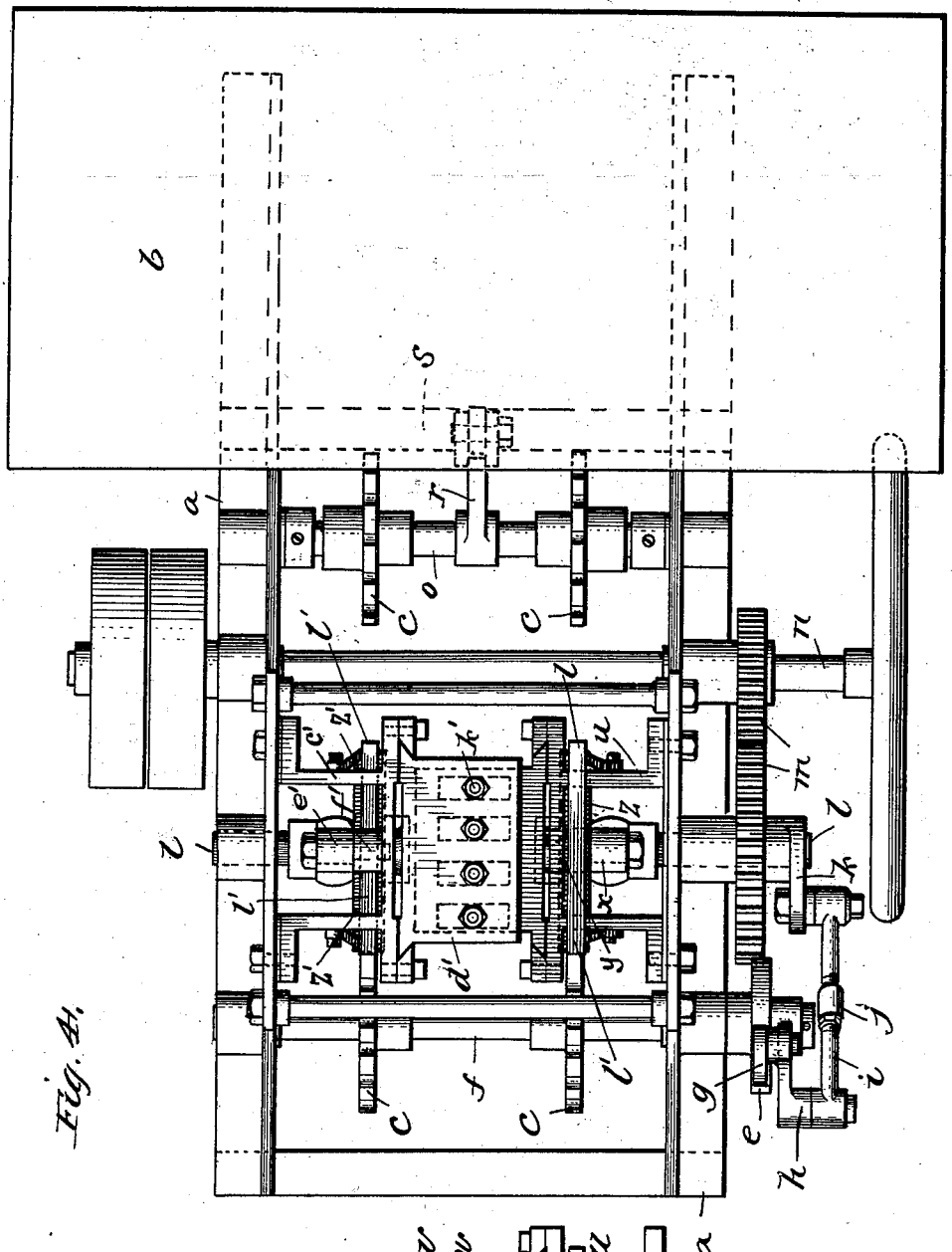

UNITED STATES PATENT OFFICE.

FERDINAND J. HAGEN, OF NEW YORK, N. Y., ASSIGNOR OF ONE-HALF TO B. H. HOMAN, OF SAME PLACE.

CIGAR-BRANDING MACHINE.

SPECIFICATION forming part of Letters Patent No. 624,326, dated May 2, 1899.

Application filed April 27, 1898. Serial No. 679,010. (No model.)

*To all whom it may concern:*

Be it known that I, FERDINAND J. HAGEN, a citizen of the United States, residing at New York, in the county of New York and State of New York, have invented certain new and useful Improvements in Cigar-Branding Machines, of which the following is a specification, reference being had therein to the accompanying drawings, in which—

Figure 1 is a side elevation; Fig. 2, a detail vertical section through the brackets supporting the die-holder; Fig. 3, a vertical section through the clamping and branding devices; Fig. 4, a plan view of the machine with the chain removed, and Fig. 5 a detail plan of the die-holder and its bracket.

The object of this invention is to provide a simple and compact machine for rapidly branding cigars without injuring their wrappers, the invention consisting of suitable devices whereby the cigars are branded in groups or series, as more fully hereinafter set forth.

Referring to the drawings by letter, $a$ designates the side plates of a suitable frame, upon the forward end of which is fixed a suitable feed-table $b$. In the rear of the feed-table, upon suitable sprocket-wheels $c$, is supported an endless chain $d$, consisting of transverse links concaved throughout their length to form cigar-troughs, each trough being longitudinally slotted along its center for the passage of the branding-dies. The upper portion of the chain is supported substantially level with the feed-table and is adapted to travel rearward from the same, its motion being intermittent and being accomplished by any suitable means, preferably by the devices shown, which consist of a ratchet-wheel $e$, secured on the end of the rear sprocket-shaft $f$ and engaged by a pawl $g$, carried by an arm $h$, pivoted on the projecting end of said shaft $f$ and operated by a pitman $i$, the length of this pitman being adjusted by means of a suitable coupling $j$ and its lower end being pivotally connected to a crank-arm $k$, secured on the projecting end of a counter-shaft $l$, which latter derives its motion by means of suitable gearing $m$, connecting it up with the drive-shaft $n$. The shaft $o$, carrying the forward sprocket-wheels, is journaled in the upper ends of arms $p$, carried by a rock-shaft $q$, journaled in the frame below the chain and provided with a forwardly-extending arm $r$, which latter is raised and lowered by a suitable bolt $s$, provided with an adjusting-nut $t$, by which means the belt or chain can be readily kept taut.

Projecting inward under the upper portion of the chain from one of the side plates of the frame is a bracket $u$, upon the inner vertical face of which is mounted a vertically-sliding die-holder $v$, carrying a series of dies $w$ in its upper surface. This die-holder is reciprocated by a pitman $x$, pivotally connected at its upper end to a wrist-pin $y$, carried by the die-holder and working through a vertical slot in bracket $u$, and at its lower end this pitman is attached to a crank-arm or cam $z$, carried by the counter-shaft $l$. The die-holder is heated by a suitable burner $a'$, supported below it, and its dies are so spaced that they are adapted to pass up through the slots in the bottoms of the cigar-troughs when the die-holder is raised to its highest point. The throw of the stroke of the die-holder may be nicely regulated by suitable coupling $b'$, inserted at a suitable point in the pitman $x$.

Projecting inward over the chain from the opposite side of the machine carrying the bracket $u$ is a similar bracket $c'$, upon the face of which is mounted a vertically-sliding head $d'$, which is reciprocated by means of a pitman $e'$, pivotally connected at its upper end to a wrist-pin $f'$, carried by said head and working through a slot in the bracket similar to the slot in bracket $u$, the lower end of said pitman being connected to a suitable cam $z'$, carried by the shaft $l$. The length of the stroke of said pitman may be regulated by a suitable coupling $g'$. Carried by the head $d'$ is a series of transverse clamp-blocks $h'$, concaved on their under sides to fit down over the cigars held in the troughs below, these clamp-blocks being vertically in line with the dies, as shown. These clamp-blocks slide vertically in the head and are kept normally depressed by coil-springs $i'$, surrounding their vertical stems within the head, the head being made hollow to receive said springs. The upper ends of the stems of the clamp-blocks are provided with stop-nuts $k'$, which limit their downward movement.

It will be observed that by the ratchet mechanism the chain is intermittently moved, the distance of each movement being determined by the number of cigars the machine is adapted to brand at each operation, the machine shown being constructed to brand four cigars at one time. The cigars are placed in the troughs as the same come up level with the feed-table, it being simply necessary that the operator see that each trough contains a cigar. At each interval of rest the head carrying the clamp-blocks descends and resiliently clamps the cigars thereunder in their respective troughs, the chain being supported at that point by suitable ways $l'$. While thus clamped the dies are forced up through the slots in the troughs and into the bodies of the cigars, the pressure exerted by the clamp-blocks being sufficient to hold the cigars down in the troughs against the action of the dies, whereby injury to the cigars is avoided. Instantly after the branding operation the clamps and dies are reciprocated away from the chain, and the same is again moved far enough to bring a new series of cigars under the clamps, the branded cigars dropping out at the rear end of the chain into a suitable receptacle.

It will be observed that the clamp-blocks are supported independently, so that they accommodate themselves to cigars of varying sizes. It will also be observed that the troughs and the grooved clamp-blocks grasp the cigars in such a manner that distortion and injury during the pressure exerted by the branding-dies is avoided. It will also be observed that the clamp-blocks and the chain form a sort of two-part clamp, the clamp-blocks being the upper members of the clamp and the troughs being the lower members thereof, the dies being adapted to pass through one of the members, preferably the lower member.

It will be observed that by my improved machine I am enabled to rapidly brand cigars of varying sizes without injury to their wrappers and without distortion.

Having thus fully described my invention, what I claim, and desire to secure by Letters Patent, is—

1. In a cigar-branding machine, the combination of a frame, a chain supported therein and carrying a series of transverse troughs, a reciprocating clamp-block resiliently supported above the chain and adapted to descend upon the cigars in the trough and clamp the same therein, the chain thereby forming one member of a two-part clamp, and a branding-die adapted to pass through an opening in one of said members, and means for reciprocating this die, as and for the purposes set forth.

2. In a branding-machine, the combination of a frame, an endless chain and means for intermittently moving the same, the links of said chain being provided with means for holding the articles to be branded and each being provided with an opening, a series of branding-dies supported below the upper portion of said chain, means for reciprocating these dies through the openings in the chain-links, means for clamping the articles to be branded down upon the chain, and means for reciprocating said clamping means, substantially as described.

3. In a branding-machine, the combination of a frame, an endless chain and means for intermittently moving it, said chain carrying transverse troughs to receive the article to be branded, said troughs being provided with die-openings, dies supported under the upper portion of said chain and means for reciprocating them through the openings, a reciprocating head supported above the chain and carrying a series of independent resiliently-supported clamp-blocks, substantially as described.

In testimony whereof I hereunto affix my signature, in the presence of two witnesses, this 23d day of April, 1898.

FERDINAND J. HAGEN.

Witnesses:
  H. KAFKA,
  LEO HARBURGER.